US012522687B2

(12) United States Patent
Emanuel, Jr. et al.

(10) Patent No.: US 12,522,687 B2
(45) Date of Patent: Jan. 13, 2026

(54) LOW FREE POLYURETHANE PREPOLYMER COMPOSITION

(71) Applicant: Urethane Systems USA LLC, Perth Amboy, NJ (US)

(72) Inventors: Ronald M. Emanuel, Jr., Morris, CT (US); Polina Ware, Southington, CT (US); Gerald King, Waterside (GB)

(73) Assignee: Urethane Systems USA LLC, Perth Amboy, NJ (US)

( * ) Notice: Subject to any disclaimer, the term of this patent is extended or adjusted under 35 U.S.C. 154(b) by 508 days.

(21) Appl. No.: 17/642,733

(22) PCT Filed: Sep. 14, 2020

(86) PCT No.: PCT/US2020/050622
§ 371 (c)(1),
(2) Date: Mar. 14, 2022

(87) PCT Pub. No.: WO2021/051039
PCT Pub. Date: Mar. 18, 2021

(65) Prior Publication Data
US 2022/0325028 A1 Oct. 13, 2022

Related U.S. Application Data

(60) Provisional application No. 62/899,476, filed on Sep. 12, 2019.

(51) Int. Cl.
C08G 18/10 (2006.01)
C08G 18/48 (2006.01)
C08G 18/76 (2006.01)
C09J 175/08 (2006.01)
C08K 3/08 (2006.01)
C08K 3/34 (2006.01)
C08K 3/36 (2006.01)

(52) U.S. Cl.
CPC ......... C08G 18/4808 (2013.01); C08G 18/10 (2013.01); C08G 18/7692 (2013.01); C09J 175/08 (2013.01); C08K 3/08 (2013.01); C08K 2003/0812 (2013.01); C08K 3/346 (2013.01); C08K 3/36 (2013.01)

(58) Field of Classification Search
CPC . C08G 18/10; C08G 18/4808; C08G 18/7692
See application file for complete search history.

(56) References Cited

U.S. PATENT DOCUMENTS

| 4,786,703 A | 11/1988 | Starner et al. |
| 4,888,442 A | 12/1989 | Dunlap et al. |
| 4,892,920 A | 1/1990 | Quay et al. |
| 5,115,071 A * | 5/1992 | Quay ................ C09D 175/04 528/65 |
| 5,202,001 A | 4/1993 | Starner et al. |
| 5,703,193 A | 12/1997 | Rosenberg et al. |
| 6,133,415 A | 10/2000 | Markley et al. |
| 6,174,984 B1 | 1/2001 | Peter |
| 6,280,561 B1 | 8/2001 | McInnis et al. |
| 6,866,743 B2 | 3/2005 | Paulsen et al. |
| 6,884,904 B2 | 4/2005 | Smith et al. |
| 6,943,202 B2 | 9/2005 | Zhu et al. |
| 2004/0259968 A1 | 12/2004 | Krebs |
| 2005/0154172 A1 | 7/2005 | Conner |
| 2006/0128927 A1 | 6/2006 | Gurtler et al. |
| 2007/0060731 A1 | 3/2007 | Wind et al. |

FOREIGN PATENT DOCUMENTS

| EP | 0288823 A1 * | 2/1988 | ............ C08G 18/76 |
| EP | 0731119 A2 * | 11/1996 | ............ C08G 18/10 |
| EP | 1 746 117 A1 | 1/2007 | |
| JP | 8176252 A2 | 7/1996 | |
| WO | 0140340 A3 | 6/2001 | |

OTHER PUBLICATIONS

Thompson, Corley M., "Gel Permeation Chromatographic Analysis of Polyurethant Prepolymer Synthesis Kinetics", Journal of Polymer Science: Part A: Polymer Chemistry, vol. 28, (1990), pp. 333-344.
CHEMLOK 218 Adhesive, Lord Technical Data, Lord Corporation, 2012, 4 pages.
European Search Report from corresponding European Application No. dated Mar. 31, 2020, two pages.
Office Action issued Jul. 21, 2025, in European Patent Application No. 20780532.6, (8 pages).

* cited by examiner

Primary Examiner — Michael L Leonard
(74) Attorney, Agent, or Firm — Oblon, McClelland, Maier & Neustadt, L.L.P.

(57) ABSTRACT

A polyurethane prepolymer composition may include more than 0 wt. % and less than 1.0 wt. % free diisocyanate monomer. The polyurethane prepolymer may include less than 80 wt. % of a 2:1 stoichiometric adduct of diisocyanate and at least one polyol (perfect prepolymer). Curable compositions may include such polyurethane prepolymer compositions and the such polyurethane prepolymer compositions may be used as adhesives.

19 Claims, No Drawings

LOW FREE POLYURETHANE PREPOLYMER COMPOSITION

CROSS-REFERENCE TO RELATED APPLICATIONS

The present application is the national stage of international application PCT/US2020/050622, filed on Sep. 14, 2020, and claims the benefit of the filing date of U.S. Prov. Appl. No. 62/899,476, filed on Sep. 12, 2019, the content of each of which is incorporated by reference.

The present invention relates to a polyurethane prepolymer composition comprising more than 0 wt. % and less than 1.0 wt. % free diisocyanate monomer wherein the polyurethane prepolymer comprises less than 75 wt. % of a 2:1 stoichiometric adduct of diisocyanate and at least one polyol (perfect prepolymer), curable compositions comprising these polyurethane prepolymer compositions and the use of these polyurethane prepolymer compositions as adhesives.

BACKGROUND OF THE INVENTION

Isocyanate terminated polyurethane prepolymers are commonly used to produce polyurethane products like elastomers, foams, coatings, adhesives, sealants, and binders. However, the polyurethane prepolymer manufacturing process typically results in high residual concentrations of the polyisocyanate monomer used in the prepolymer synthesis. The residual polyisocyanate can lead to potential health and safety issues, and may also be detrimental to the performance and attributes of the end use product. For example, residual polyisocyanate can lead to undesired losses in open time, product instability, increased moisture sensitivity and decreased adhesion due to migration of these molecules to the interface. Polyurethane prepolymers that contain low levels of residual diisocyanate of less than 1.0 wt. %, preferably less than 0.1 wt. % based on the total weight of polyurethane prepolymer, can reduce health and safety risks and improve end product performance.

Since residual polyisocyanate can pose significant health and safety risks as well as reductions in product performance, a number of products and processes have been introduced that offer reduced residual polyisocyanate levels.

JP08176252 discloses reacting MDI with straight chain molecule with Mw=250-4,000 and two active hydrogens at an equivalent ratio (NCO:OH) of 2.5-10:1. Free MDI is vacuum distilled to 1 wt. % or less. The examples show polytetramethylene glycol (PTMEG) and ethylene glycol adipate.

U.S. Pat. No. 4,786,703 discloses a process for producing a reaction product comprising a TDI prepolymer, wherein at least about 90% of such prepolymer consists of a prepolymer of two moles TDI per mol long chain diol and the level of unreacted TDI is less than about 0.15%. This document teaches the benefits of high amount of perfect prepolymers of more than 90 wt. %.

U.S. Pat. No. 4,888,442 discloses a process for reducing the free monomer content of a polyisocyanate adduct by treating the adduct with 2-30 wt. % inert solvent in an agitated thin-layer evaporator under conditions sufficient to reduce the free monomer content of the polyisocyanate adduct mixture below that level which is obtainable in the absence of a solvent. There are no examples showing the use of MDI as a suitable diisocyanate to prepare the polyisocyanate adduct.

U.S. Pat. No. 4,892,920 discloses a process for producing cyclohexane diisocyanate (CHDI) based prepolymers free of unreacted CHDI and essentially free of oligomeric CHDI by-products.

U.S. Pat. No. 5,202,001 discloses preparing polyurethane prepolymers having low levels of residual organic diisocyanate. The examples shows prepolymers made from toluene diisocyanate (TDI), isophorone diisocyanate (IPDI) and methylene-bis[(4-cyclohexyl)-diisocyanate] (CHDI).

U.S. Pat. No. 5,703,193 discloses a process for reducing the amount of residual organic diisocyanate monomer in a polyurethane prepolymer reaction product by distilling in the presence of an inert solvent blend, one with boiling point above the monomer and one with boiling point below. Comparative examples show the removal of MDI monomer from a PTMEG 1000/MDI prepolymer reaction product.

U.S. Pat. No. 6,133,415 discloses countercurrent extraction method for making polyurethane prepolymers. The examples show MDI/PTMEG prepolymers processed to give low free MDI.

U.S. Pat. No. 6,174,984 discloses a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer.

EP-A-0827995 discloses hot melt adhesives comprising a polyisocyanate prepolymer prepared by reacting a polyisocyanate with a functionality of at least 2 with a polyol with a functionality of at least 2, the reaction product comprising at least 90 wt. % "perfect" prepolymer and less than 2 wt. % unreacted isocyanate monomer and the prepolymer having a free NCO functionality ranging from 0.2 to 8 wt. %. This document teaches the benefits of high amount of perfect prepolymers of more than 90 wt. %.

U.S. Pat. No. 6,866,743 discloses prepolymer composition based on MDI or TDI consisting essentially of at least 80 wt. % perfect prepolymers and less than 2 wt. % free MDI monomer suitable for use in non-structural polyurethane adhesive compositions.

U.S. Pat. No. 6,884,904 discloses an MDI/polypropylene polyether prepolymer composition consisting essentially of at least 80 wt. % perfect prepolymers and less than 2 wt. % free MDI monomer suitable for use in polyurethane adhesive compositions. Polyurethane prepolymer compositions comprising less than 75 wt. % perfect prepolymer and less than 1.0 wt. % residual diisocyanate monomer are not disclosed.

U.S. Pat. No. 6,943,202 discloses polyurethane prepolymer with NCO content of at least 70% of the theoretical NCO content for a pure ABA structure and preferably at least 80% of the theoretical NCO content for a pure ABA structure.

WO-A-01/040340 discloses polyurethane compositions having a low level of monomeric diisocyanates can be prepared in a two-stage process wherein a diol component having a molecular weight of less than 2000 and a monomeric diisocyanate having a molecular weight of less than 500 are reacted in a first step. A molar ratio of MDI:polyol of 5:1 to 10:1 is preferred, as it as it favors the formation of a final prepolymer (after removal of solvent and free MDI monomer) with NCO content at least about 80% of the theoretical NCO content for a pure ABA structure. The resulting low-monomer macromolecular diisocyanate is reacted in a second step with a polyol to form a reactive prepolymer having isocyanate end groups. Such polyurethane compositions are said in this document to be useful as binders for reactive one- or two-component adhesive/sealant materials, which may be solvent containing, and also, provided the polyols are chosen appropriately, for preparing reactive hot melts.

US-A-2004/259968 discloses a composition comprising at least one reaction product of polyols with a stoichiometric excess of mixtures of asymmetrical polyisocyanates having a molecular weight below 500 and an NCO functionality from 1.75 to 2.5 and high molecular weight polyisocyanates. In a non-inventive comparison example, a prepolymer based on 4,4'-MDI and PPG-750 in a ratio of 5:1 with an residual amount of monomeric MDI of <0.1% is disclosed.

US-A-2005/154172 discloses a polyurethane prepolymer which is the reaction product of IPDI with polypropylene glycol (PPG) with Mw=4200 g/mol and PPG with Mw=6300 g/mol, comprising 0.05 wt. % residual IPDI, having an amount of oligomer adducts of 44% and having a NCO content of 1.5 wt. %. The document is silent about the use of MDI as diisocyanate as well as of the adhesive characteristics of the disclosed prepolymers.

EP-A-1746117 discloses a polyurethane prepolymer which is the reaction product of 4,4'-methylane diphenyl diisocyanate (4,4'-MDI) and a trifunctional polyether polyol (PPO; Lupranol® 2095; prepared by an addition reaction of polypropylene oxide and ethylene oxide with glycerol as an initiator molecule) with Mw=4350 g/mol, comprising 0.083 wt. % unreacted monomer (residual MDI), having an amount of perfect ABA structure of at most 80 wt. % and having an NCO content of 2 wt. %.

US-A-2007/060731 discloses, that the formation of oligomeric polyurethanes is undesirable, when defined ABA structures of isocyanate and polyol are to be built, as such defined structures have a positive effect on the property profile of e.g. compact elastomers such as thermoplastic polyurethanes or pourable elastomers. Asymmetrical diisocyanates such as 2,4'-MDI is reacted with PPG-450 to provide prepolymers with diurethane, of more than 80 area-%, determined via gel permeation chromatography (GPC). Such asymmetrical diisocyanates have a lower reactivity. 2,4'-MDI is also not easily available on industry scale.

In view of the prior art, it becomes evident that polyurethane prepolymers with high amount of "perfect" prepolymers and low amounts of oligomers were preferred.

It was a long felt desire to provide polyurethane prepolymers with low amounts of free diisocyanate monomers, which nevertheless provide cured polyurethanes with comparable or even better physical properties such as tear strength or adhesives characteristics such as high shear strength as those polyurethane prepolymers with high NCO functionality.

It has been now surprisingly found, in contrast to the long standing teaching in the prior art, that polyurethane prepolymers with low amounts of residual free diisocyanate monomer of more than 0 wt. % and less than 1.0 wt. %, based on the total weight of polyurethane prepolymer and less than 75 wt. % of a 2:1 stoichiometric adduct of diisocyanate and at least one polyol (perfect prepolymer) show desired performance advantages over polyurethane prepolymers with low amounts of residual diisocyanate monomers and 75 wt. % or more of a 2:1 stoichiometric adduct of diisocyanate and least one polyol.

SUMMARY OF THE INVENTION

The present invention is directed to an isocyanate terminated polyurethane prepolymer composition comprising a polyurethane prepolymer which is the reaction product of the reaction of an excess of diisocyanate with at least one polyol, and more than 0 wt. % and less than 1.0 wt. %, preferably less than 0.5 wt. % and more preferably less than 0.1 wt. % free diisocyanate monomer based on the total weight of the polyurethane prepolymer, wherein the polyurethane prepolymer comprises less than 75 wt. % of a 2:1 stoichiometric adduct of diisocyanate and at least one polyol, preferably less than 73 wt. % of a 2:1 stoichiometric adduct of diisocyanate and at least one polyol, more preferably less than 70 wt. % of a 2:1 stoichiometric adduct of diisocyanate and at least one polyol, based on the total weight of the polyurethane prepolymer.

DETAILED DESCRIPTION OF THE INVENTION

This invention relates to a polyurethane prepolymer composition based on the reaction of an excess of a diisocyanate and least one polyol, having a low level of residual diisocyanate monomer and a high oligomer content.

The polyurethane prepolymer composition is the product resulting from the reaction of least one polyol containing "n" (at least 2) OH groups and an excess of a diisocyanate. The polyurethane prepolymer reaction product comprises oligomers and so called "perfect" prepolymers. The requisite high oligomer content of the prepolymer composition is >20 wt. % or, reciprocally, it can expressed in terms of its content of a 2:1 stoichiometric adduct of diisocyanate and polyol which should be <75 wt. % based on the total weight of the prepolymer composition.

2:1 stoichiometric adducts of diisocyanate and at least one polyol (perfect prepolymers") as well as processes for preparing them, are widely known and describe in the art, for example in EP-A-0288823, EP-A-0370408, EP-A-0370392, EP-A-0827995, EP-A-1237967, EP-A-1237971, EP-A-1249460, EP-A-1253159, EP-A-1499653 and EP-A-1553118.

A 2:1 stoichiometric adduct of diisocyanate and at least one polyol of the present invention, is the stoichiometric end capping product of one polyol molecule (B) with two diisocyanate molecules (A). The stoichiometric proportions for the diisocyanate and polyol in the reaction products are 2:1 in the case of diols (difunctional polyol (B)). The perfect prepolymer is essentially an adduct containing only one molecule of the polyol (B) in each prepolymer molecule A:B:A (or A2B).

Oligomers of the present invention are, for a difunctional polyol (B) (n=2), any species with a composition greater than the perfect 2:1 molecular ratio (A:B:A; diurethane), for example 3:2 (A:B:A:B:A; triurethane) or 4:3 (A:B:A:B:A:B:A).

The invention requires that the polyurethane prepolymer composition (1) comprises less than 75 wt. %, preferably less than 73 wt. %, more preferably less than 70 wt. %, of a 2:1 stoichiometric adduct of diisocyanate and polyol based on the total weight of polyurethane prepolymer and (2) comprises more than 0 wt. % and less than 1.0 wt. % unreacted, and thus free, diisocyanate monomer. In a preferred embodiment, the invention requires that this diisocyanate prepolymer reaction product (1) comprises more than 30 wt. % of a 2:1 stoichiometric adduct of diisocyanate and at least one polyol and less than 75 wt. %, preferably less than 73 wt. %, more preferably less than 70 wt. % of a 2:1 stoichiometric adduct of diisocyanate and least one polyol and (2) contains more than 0 wt. % and less than 0.1 wt. % unreacted diisocyanate monomer.

The polyurethane prepolymer reaction product contains free prepolymer NCO functionality ranging from 0.2 to 15 wt. %, preferably, 0.5 to 8 wt. % and more preferably 5 to 7 wt. %. Free NCO content is typically determined in % by weight according to ASTM D1638-70.

In one embodiment, the polyurethane prepolymer compositions of the present invention contain free prepolymer NCO groups ranging from 0.2 to 15 wt. %, preferably 0.5 to 8 wt. %, more preferably 5 to 7 wt. % and more than 0 wt. % and less than 1.0 wt. % unreacted diisocyanate monomer, preferably less than 0.5 wt. %, and more preferably less than 0.1 wt. %.

In a preferred embodiment of the present invention, the polyurethane prepolymer comprises at least 30 wt. % of a 2:1 stoichiometric adduct of diisocyanate and at least one polyol and less than 75 wt. % of a 2:1 stoichiometric adduct of diisocyanate and at least one polyol, preferably less than 75 wt. % of a 2:1 stoichiometric adduct of diisocyanate and at least one polyol, more preferably less than 70 wt. % of a 2:1 stoichiometric adduct of diisocyanate and at least one polyol, even more preferably less than 65 wt. % of a 2:1 stoichiometric adduct of diisocyanate and at least one polyol, or reciprocally at least 20 wt. % oligomers, preferably at least 25 wt. % oligomers, more preferably at least 30 wt. % oligomers and even more preferably at least 35 wt. % oligomers, based on the total weight of prepolymer.

Diisocyanate

The diisocyanate of the present invention is not particularly limited. Suitable diisocyanates of the present invention include aliphatic diisocyanates, cycloaliphatic diisocyanates, polycyclic diisocyanates, aromatic diisocyanates and aliphatic-aromatic diisocyanates.

In a preferred embodiment, the diisocyanate of the present invention is methylene diphenyl diisocyanate (MDI), paraphenylene diisocyanate (PPDI), naphthalene diisocyanate (NDI), hexamethylene diisocyanates (HDI), cyclohexyl diisocyanates (CNDI), isophorone diisocyanate (IPDI), or toluene diisocyanate (TDI).

In a more preferred embodiment, the polyurethane prepolymer is prepared using a symmetric diisocyanate.

In a more preferred embodiment, the polyurethane prepolymer is prepared using 4,4'-methylene diphenyl diisocyanate (4,4'-methylene-bis-(phenyl isocyanate); 4,4'-diphenylmethane diisocyanate; 4,4'-MDI)).

Polyol

The present invention is not limited by the use of a particular polyol and more than one may be used. A polyol suitable for the present invention may be selected from any polyol known in the art.

Polyols include compounds having more than one hydroxyl groups. The formation of such polyols is well known in the art.

In many embodiments, diols (with a hydroxyl functionality of 2.0) are preferred over triols or polyols with higher hydroxyl functionality to avoid an increase of the viscosity.

In some embodiments of the present invention, the polyol comprises at least one polyester polyol, at least one polyether polyol, at least one polycaprolactone polyol, at least one polycarbonate polyol, or combinations thereof.

Preferred polyols are polypropylene oxide based polyether polyols, also known as polypropylene glycols (PPG), which include, but are not limited to, polypropylene polyether polyols with functionality of two or greater, average equivalent weight between 100 and 8,000. Also included are ethylene oxide capped PPGs and low monol containing PPGs.

Additional polyols which may be used include alkylene diols such as diethylene glycol (DEG), other di- or multi-functional alkylene ether polyols such as poly(tetramethylene ether)glycol (PTMEG) and polyethylene oxide, polyester polyols, polyester polyols from polycaprolactones and hydroxyl terminated polybutadienes.

The above polyether and polyester polyols are commonly used for producing polyurethane prepolymers. The polyol can be blended such that the at least one polyol, either the single polyol or a blend, used in making the prepolymer has a weight average molecular weight (Mw) ranging from about 50 to 16,000 g/mol, preferably 250 to 4,000 g/mol and preferably from 500 to 1,200 g/mol. In another preferred embodiment, the at least one polyol comprises two polypropylene glycols with different molecular weight. Average molecular weight can be determined with gel permeation chromatography (GPC).

In a preferred example, the at least one polyol of the polyurethane prepolymer composition of the present invention comprises a first polypropylene glycol with a weight average molecular weight Mw of 200 to 800 g/mol, preferably 200 to 600 g/mol, more preferably 400 to 600 g/mol and a second polypropylene glycol with an average molecular weight of 800 to 12,000 g/mol, preferably 800 to 4,000 g/mol and more preferably 800 to 2,000 g/mol.

Process for Preparing Polyurethane Prepolymer

Polyurethane prepolymer according to this present invention is prepared by the reaction of an excess of diisocyanate with at least one polyol.

In preferred embodiments, the polyurethane prepolymer of the present invention is prepared by reaction of at least one polyol with an excess of MDI, preferably 4,4'-MDI.

In some embodiments, the polyurethane prepolymers are prepared by reaction of an excess of a diisocyanate, preferably MDI, more preferably 4,4'-MDI with at least one polypropylene glycol.

A polyurethane prepolymer of the present invention can be prepared under the conditions of heating a reaction mixture of the polyol and the diisocyanate at 50° C. to 150° C. for 10 min to 24 h, preferably 60° C. to 100° C. for 2 h to 6 h.

Methods for synthesizing polyurethane prepolymers are generally known in the art. Generally, the polyurethane prepolymers of the present invention are made using standard industrial reaction processes and conditions as known in the art for the production of polyurethane prepolymers generally.

In a preferred embodiment, the addition of the at least one polyol to the diisocyanate is done batch wise and not dropwise.

The polyurethane prepolymer of the present invention is typically prepared using an excess of diisocyanate monomer resulting in a polyurethane prepolymer composition comprising unreacted monomer, e.g., unreacted or "free" diisocyanate. Levels of 20 wt. % or more of free diisocyanate monomer based on the polyurethane prepolymer composition, may be encountered.

In a preferred embodiment, the prepolymer reaction is not catalyzed. The use of catalysts might lead to residual traces of catalysts in the polyurethane prepolymer reaction product which might effects the curing process.

The polyurethane prepolymer of the present invention is a "low free monomer" polyurethane prepolymer (also known as "low free" or "LF" or "low isocyanate"="LNCO").

Understood by one of ordinary skill in the art to have lower amounts of "free" monomer isocyanate groups than conventional polyurethane prepolymers, i.e. the polyurethane prepolymer compositions of the present invention have less than 1.0 wt. % free diisocyanate monomers based on the total weight of the polyurethane prepolymer.

The unreacted diisocyanate monomer in the prepolymer reaction product is removed to a concentration of more than 0 wt. % and less than 1 wt. %, preferably less than 0.5 wt. %, most preferably less than 0.1 wt. %, based on the total weight of polyurethane prepolymer. Polyurethane prepolymer without any residual free diisocyanate monomer would have an unfavored high viscosity.

The amount of free diisocyanate monomers in prepolymer compositions can be determined in accordance with common measurement methods such as HPLC (high performance liquid chromatography) measurement.

The amount of adducts and oligomers can be determined by MALDI-MS.

Any process suitable in reducing the amount of free diisocyanate monomer in the polyurethane prepolymer composition to the low levels of the present invention may be employed. A variety of methods is known for reducing the residual isocyanate content of polyisocyanate monomers to a minimum such as wiped film evaporation, solvent aided distillation/co-distillation, molecular sieves, and solvent extraction. Distillation under reduced pressure is preferred, in particular thin film or agitated film evaporation under vacuum.

Curable Polyurethane Prepolymer Composition

The invention further relates to a curable polyurethane prepolymer composition, comprising the polyurethane prepolymer composition of the present invention and at least one curative.

Curative

Suitable curatives for the curable polyurethane prepolymer composition of the present invention include diamines, polyols, or blends thereof.

Examples of diamines include both aromatic and aliphatic diamines, primary and secondary amine terminated polyether polyols, and difunctional, trifunctional, and polymeric amines.

Examples of polyols include polyester or polyether polyols, which can be diols, triols and tetrols, having primary, secondary and/or tertiary alcohol groups. Preferred polyol curatives are 1,4-butanediol (BDO), or hydroquinone bis(2-hydroxyethyl) ether (HQEE). These polyols may be mixed with the diamines.

The ratio of the prepolymer to the curative is typically in the range of from 0.5:1 to 1.5:1, preferably from 0.7:1 to 1.2:1, and more preferably from 1.1:1 to 0.90:1.

Additives

The curable polyurethane prepolymer composition of the present invention optionally comprises further additives, such as catalysts; thickening agents; tackifying resins, for example abietic acid, abietic ester, terpene resins, terpene phenol resins or hydrocarbonaceous resins; fillers, for example silicates, talcum, calcium carbonates, clays or carbon black; plasticizers, for example phthalates: thixotropiczing agents, for example bentones, pyrogenic silicas, urea derivatives, fibrillated or pulped short fibers; color agents, for example color pastes and pigments or drying agents.

Optional catalysts include tertiary amine catalysts and suitable organometallic catalysts, such as those derived from tin, zirconium, and bismuth.

Adhesive

The present invention is also related to a method for adhesively joining or sealing two substrates, comprising the steps of:

(1) applying onto a substrate the curable polyurethane prepolymer composition of the present invention, and (2) contacting the curable polyurethane prepolymer composition applied on the substrate to a second substrate such that a bond is formed.

In one embodiment, the polyurethane adhesive composition used in the method of the present invention comprises the above-described polyurethane prepolymer reaction product which can be prepared by reacting a diisocyanate, preferably 4,4'-MDI with a polypropylene polyether polyol with an average molecular weight of 500 to 1,100 g/mol.

Substrates that may be bonded with the adhesive include cold rolled steel, aluminum, fiberglass reinforced polyester (FRP), sheet molding compound (SMC), plastics, wood, and glass.

Thus, the present invention relates further to the use of the curable polyurethane prepolymer composition of the present invention as an adhesive. In a preferred embodiment, a polyurethane prepolymer composition comprising a polyurethane prepolymer obtained by the reaction of an excess of 4,4'-MDI with at least one polypropylene glycol, and comprising more than 0 wt. % and less than 1.0 wt. %, preferably less than 0.5 wt. % and more preferably less than 0.1 wt. % free 4,4'-MDI monomer based on the total weight of the polyurethane prepolymer, wherein the polyurethane prepolymer comprises less than 75 wt. % of a 2:1 stoichiometric adduct of diisocyanate and at least one polyol, preferably less than 73 wt. % of a 2:1 stoichiometric adduct of diisocyanate and at least one polyol, more preferably less than 70 wt. % of a 2:1 stoichiometric adduct of diisocyanate and at least one polyol based on the total weight of the polyurethane prepolymer.

In a preferred embodiment, the amount of ABABA oligomer is 25 wt. % or more base on the total weight of the polyurethane prepolymer.

The present invention encompasses also the use of polyurethane prepolymer composition of the present invention to prepare curable polyurethane prepolymer compositions.

The present invention encompasses also the use of polyurethane prepolymer composition of the present invention as a one component foam (OFC).

The present invention encompasses also the use of the curable polyurethane prepolymer composition of the present invention as an adhesive at room temperature or as a holt-melt adhesive.

The use of a polyurethane prepolymer composition of the present invention in an adhesive composition provides adhesives showing improved shear strength after 1 or 7 days curing at room temperature compared to adhesive compositions based on non-inventive polyurethane prepolymers with low amounts of oligomers or non-inventive conventional polyurethane prepolymers with high amounts of residual diisocyanate monomers, and the health and safety benefits associated with lower levels of volatile diisocyanate monomer of less than 1.0 wt. % based on the total weight of the polyurethane prepolymer.

EXAMPLES

The following materials were used in the Examples:

| | |
|---|---|
| Mondur ® M | 4,4'-methylene diphenyl diisocyanate; MDI; CAS No.: 101-68-8; (Commercially available from Covestro) |
| Lupranol ® 1200 | polypropylene glycol; PPG-500; Mw = 500 g/mol; CAS No.: 25322-69-4; (Commercially available from BASF) |
| Lupranol ® 1100/1 | polypropylene glycol; PPG-1100; Mw = 1100 g/mol; CAS No.: 25322-69-4; (Commercially available from BASF) |
| Tri(propylene)glycol | tripropylene glycol; TPG; CAS No.: 24800-44-0; (Commercially available from Sigma Aldrich) |
| Adhesive experiments | |
| Quadrol ® polyol | (Ethylenedinitrilo)tetra-2-propanol; CAS No.: 102-60-3; Commercially available from Sigma Aldrich |
| Microtuff ® 325F | talc; Commercially available from Barretts Minerals |
| Arcol ® Polyol PPG-2000 | polypropylene glycol; PPG-2000; Mw = 2,000 g/mol; Commercially available from Covestro |
| Cab-o-sil ® TS 720 | fumed silica; Commercially available from Cabot |
| Aluminum Powder, 325 Mesh, Grade 101 | Commercially available from Toyal America |
| Microbeads (10 mm) | Commercially available from Cataphote |
| Aluminum coupon | Commercially available from AIKemix |
| Methyl ethyl ketone | (MEK) Commercially available from Sigma Aldrich |
| Chemlok ® 218 | One-coat adhesive (Commercially available from Lord) |
| 1,4-butanediol | (BDO) Aldrich Commercially available from Sigma |
| Hydroquinone bis(2-hydroxyethyl) ether | (HQEE) Aldrich. Commercially available from Sigma |

Methods:

Free NCO Content (% NCO)

Free NCO content was determined in % by weight according to ASTM D1638-70.

Residual Monomer Content:

The amount of free 4,4'-MDI monomers in the polyurethane prepolymer reaction product is determined by HPLC (high performance liquid chromatography).

Oligomer Content:

The oligomer content of the polyurethane prepolymer composition is measured using MALDI-MS. The intensities of each type of structure were summed and the relative amounts are shown in Table 2a. The samples are prepare by a mix of 20 mg/mL DCTB (trans-2-[3-(4-tert-Butylphenyl)-2-methyl-2-propenylidene]malononitrile) in THF, 10 mg/mL sample in THF, and 20 mg/mL NaTFA in THF in a 10:10:1 ratio. Acquisition is done by linear mode (positive ion, mass range 300-30000). Data analysis is done by baseline subtraction (smooth SG7points, Centroid 0.3 width S/N 1).

Example 1 (Inventive)

6046 g of 4,4'-methylene diphenyl diisocyanate (4,4'-MDI) were added to a reactor and heated to 50° C. 2896 g of PPG-500 and 1646 g of PPG-1100 was then added. The reaction temperature was held at 80° C. for 4 hours. Excess residual 4,4'-MDI monomer was removed by thin-film distillation under reduced pressure from the reaction product to a level of less than 0.1 wt. % residual 4,4'-MDI, and total % NCO content of 6.05 wt. %.

Example 2 (Inventive)

2880 g of 4,4'-MDI were added to a reactor and heated to 50° C. 603 g of PPG-500 and 1017 g PPG-1100 was then added. The reaction temperature was held at 80° C. for 4 hours. Excess residual 4,4'-MDI monomer was removed by thin-film distillation under reduced pressure from the reaction product to a level of less than 0.1 wt. % residual 4,4'-MDI, and total % NCO content of 6.10 wt. %.

Example 3 (Comparative)

4182 g of 4,4'-MDI were added to a reactor and heated to 50° C. 443 g of PPG-500 and 1500 g PPG-1100 was then added. The reaction temperature was held at 80° C. for 4 hours. Excess residual 4,4'-MDI monomer was removed by thin-film distillation under reduced pressure from the reaction product to a level of less than 0.1 wt. % residual 4,4'-MDI, and total % NCO content of 5.87 wt. %.

Example 4 (Comparative)

1584 g of 4,4'-MDI were added to a reactor and heated to 50° C. 900 g of PPG-500 and 1516 g of PPG-1100 was then added. The reaction temperature was held at 80° C. for 4 hours. The reaction product had a % NCO content of 5.90 wt. %.

The residual 4,4'-MDI monomer content is >5 wt. %.

Table 1 presents the % NCO, residual free 4,4'-MDI and oligomer content for the MDI/PPG polymers of Examples 1-4.

TABLE 1a

Characteristics of the prepolymer compositions

| Example | Polyol | Measured % NCO [wt. %] | % of theoretical NCO | residual MDI [wt. %] | Oligomer content [wt. %]** |
|---|---|---|---|---|---|
| 1* | PPG-500/PPG-1100 | 6.05 | 76 | <0.1 | 53.8 |
| 2* | PPG-500/PPG-1100 | 6.10 | 86 | <0.1 | 28.5 |
| 3  | PPG-500/PPG-1100 | 5.87 | 92 | <0.1 | 18.2 |
| 4  | PPG-500/PPG-1100 | 5.90 | N/A | >5 | >50 |

*Inventive examples; **calculated

Based on the measured wt.-percentage of free NCO groups and the molecular weights of the used MDI monomer and the polyols, a calculation of the oligomer content was performed and the results shown in table 1a. The calculation of the oligomer content is based on the assumption, that the higher molecular weight oligomer is mainly ABABA and that the amount of even higher oligomers such as ABABABA are neglected.

However, the prepolymer compositions were additionally analyzed using MALDI MS to determined exact amounts of ABA adducts as well as ABABA and ABABABA oligomers whereas A represents 4,4'-MDI and B represents PPG.

TABLE 2a

Composition of MDI PPG prepolymers determined with MALDI-MS

| Example | ABA [wt. %] | ABABA [wt. %] | ABABABA [wt. %] |
|---|---|---|---|
| 1* | 58.4 | 30.4 | 11.3 |
| 2* | 64.5 | 28.8 | 6.7 |
| 3  | 76.0 | 20.6 | 3.4 |
| 4  | 49.4 | 32.6 | 18.0 |

*Inventive examples

Table 2a shows the amounts of ABA adduct and oligomers of the examples 1 to 4 as measured with MALDI mass spectra.

The inventive examples 1 and 2 show a residual 4,4'-MDI content of less than 0.1 wt. % based on the total weight of the polyurethane prepolymer, and a oligomer content of more than 25 wt. %. Thus, the amount of 2:1 stoichiometric adduct of 4,4'-MDI and PPG is less than 75 wt. % based on the total weight of the prepolymer composition in the inventive examples 1 and 2.

Example 5

The prepolymer compositions of Examples 1-4 were evaluated in the following structural adhesive composition by room temperature curing on an aluminum coupon:

TABLE 2

Components of the adhesive composition

| Part A | wt. % | Part B | wt. % |
|---|---|---|---|
| Prepolymer (Ex.1-4) | 60 | Arcol® PPG-2000 | 16.7 |
| Aluminum Powder | 38 | Quadrol® | 33.3 |
| Cab-o-sil® TS720 | 2 | Microtuff® 325F | 27 |
|  |  | Cab-o-sil® TS720 | 1 |
|  |  | Aluminum Powder | 22 |

The adhesive composition was prepared by mixing Part A and Part B in an NCO:OH ratio of 1:0.9 while adding 1 wt. % of microbeads. The substrates were prepared according to the steps of the following substrate preparation process:

(1) Abrasion

The aluminum coupon was partly abraded with 20/40 crushed glass @80 psi Nozzle to part distance 6". The expected profile on the aluminum coupon was 2 to 3 mm.

(2) Solvent Wash

The surface was washed with acetone followed by air dry.

The adhesive composition was then applied to one side of a 2.54×12.7 cm aluminum coupon to cover at least 3.23 cm$^2$ of area then mated with a second substrate coupon to give a total lapshear overlap of 3.23 cm$^2$. Samples were cured at room temperature and 50% humidity. Samples were prepared and tested according to ASTM D10002-10 (Standard Test Method for Apparent Shear Strength of Single-Lap-Joint Adhesively Bonded Metal Specimens by Tension Loading (Metal-to-Metal)) after 1 day and 7 days. All testing done at room temperature.

TABLE 3

Lap Shear Strength data without bonding agent

| Prepolymer | Cure** | Shear strength [MPa] after 1 day | Shear strength [MPa] after 7 days |
|---|---|---|---|
| Ex 1* | RT | 12.3 | 13.0 |
| Ex 2* | RT | 12.0 | 11.8 |
| Ex 3  | RT | 9.0 | 9.1 |
| Ex 4  | RT | 10.5 | 10.6 |

*Inventive examples; **50% humidity

The results in Table 3 show that adhesive compositions based on the inventive polyurethane prepolymer examples 1 and 2 have higher shear strength after 1 and 7 days of cure compared to adhesive compositions based on non-inventive prepolymers with low amounts of oligomers (Example 3) or non-inventive conventional high amounts of free diisocyanate monomer (Example 4).

Example 6

The adhesive testing procedure was repeated as described in Example 5 with the exception that, as a third step in the substrate preparation process, a bonding agent was applied on the abraded and washed surface of the aluminum coupon before the adhesive composition was applied, according as followed:

(3) Bonding Agent

A bonding agent consisting of a 50:50 blend of methyl ethyl ketone (MEK) & Chemlok® 218 adhesive was prepared. The aluminum coupons were dipped into the bonding agent and hung vertically to dry.

The results of the shear strength tests are shown in table 4.

TABLE 4

Lap Shear Strength data with bonding agent

| Prepolymer | Cure** | Shear strength [MPa] after 1 day | Shear strength [MPa] after 7 days |
|---|---|---|---|
| Ex 1* | RT | 11.4 | 12.8 |
| Ex 2* | RT | 11.6 | 12.0 |
| Ex 3 | RT | 10.5 | 11.2 |
| Ex 4 | RT | 11.2 | 11.9 |

*Inventive examples; **50% humidity

The data in Table 4 shows that comparable shear strength between the adhesive composition based on inventive prepolymer compositions and non-inventive prepolymer compositions can only be achieved, by using and additional, unfavored, process step of applying a binding agent.

Example 7

Cast elastomers were prepared by conventional techniques using the prepolymers of Examples 1 to 4. The polyurethane prepolymer compositions were cured with 1,4-butanediol (BDO) or hydroquinone bis(2-hydroxyethyl) ether (HQEE) at 98% stoichiometry, and afterwards post-cured at 115° C. for 16 hours. Physical properties were obtained using the following ASTM test methods: Hardness (ASTM D2240); Split Tear (ASTM D-470); Trouser Tear (ASTM D-1938); Die-C Tear (ASTM D-624); Modulus, Strength at Break, Elongation (ASTM D638). Tables 5 and 6 show the data.

TABLE 5

Physical properties of cast elastomers based on polyurethane prepolymer compositions cured with HQEE

| Prepolymer Example | Hardness [Shore A/D] | Split Tear [kN/m] | Trouser Tear [kN/m] | Die-C Tear [kN/m] |
|---|---|---|---|---|
| 1* | 70D | 22.8 | 73.9 | 118.3 |
| 2* | 96A | 19.8 | 45.1 | 97.3 |
| 3 | 95A | 15.8 | 29.5 | 81.7 |
| 4 | 94A | 22.2 | 43.7 | 76.1 |

*inventive

TABLE 6

Physical properties of cast elastomers based on polyurethane prepolymer compositions cured with BDO

| Prepolymer Example | Hardness [Shore A/D] | Split Tear [kN/m] | Trouser Tear [kN/m] | Die-C Tear [kN/m] |
|---|---|---|---|---|
| 1* | 97A/60D | 15.1 | 63.3 | 48.4 |
| 2* | 80A | 6.0 | 19.1 | 26.3 |
| 3 | 62A | 3.8 | 7.5 | 25.4 |
| 4 | 75A | 6.2 | 12.9 | 32.3 |

*inventive

The low monomeric, high oligomer prepolymers of inventive Examples 1 and 2 show superior split tear, trouser tier and Die-C tear strength in comparison to non-inventive Examples 3 and 4.

TABLE 7

Physical properties of cast elastomers based on polyurethane prepolymer compositions cured with HQEE
Cured with HQEE, 98% theory, post-cured 16 hrs/115° C.

| Prepolymer Example | 100% Modulus [MPa] | 200% Modulus [MPa] | 300% Modulus [MPa] | Strength at Break [MPa] | Elongation [%] |
|---|---|---|---|---|---|
| 1* | 14.9 | 17.4 | n.d. | 21.6 | 293 |
| 2* | 15.9 | 15.8 | 17.8 | 22.8 | 418 |
| 3 | 13.3 | 13.2 | 14.6 | 25.7 | 440 |
| 4 | 11.8 | 12.5 | 13.0 | 15.0 | 492 | n.d. = not determined

The low monomeric, high oligomer prepolymers of inventive Examples 1 and 2 show higher modulus in comparison to non-inventive Examples 3 and 4.

TABLE 8

Physical properties of cast elastomers based on polyurethane prepolymer compositions cured with (1,4-butanediol) BDO
Cured with 1,4-butanediol, 98% theory, post-cured 16 hrs/115° C.

| Prepolymer Example | 100% Modulus [MPa] | 200% Modulus [MPa] | 300% Modulus [MPa] | Strength at Break [MPa] | Elongation [%] |
|---|---|---|---|---|---|
| 1* | 5.3 | 7.8 | 16.8 | 25.1 | 335 |
| 3 | 1.9 | 2.7 | 4.3 | 21.0 | 439 |
| 4 | 3.0 | 4.8 | 8.2 | 18.5 | 399 |

The low monomeric, high oligomer prepolymers of inventive Example 1 shows higher modulus in comparison to non-inventive Examples 3 and 4.

What is claimed is:

1. A polyurethane prepolymer composition, comprising:
   (a) a polyurethane prepolymer comprising, as a reaction product, (a1) an excess of 4,4'-methylene diphenyl diisocyanate and (a2) a polyol; and
   (b) free diisocyanate monomer in a range of from more than 0 to less than 1.0 wt. %, based on total polyurethane prepolymer weight,
   wherein an NCO content of the polyurethane prepolymer is in a range of from 5 to 7 wt. %,
   wherein the polyurethane prepolymer comprises less than 75 wt. % of a 2:1 stoichiometric adduct of the diisocyanate and the polyol, based on the total polyurethane prepolymer weight,
   wherein the polyol (a2) comprises (a2a) a first polypropylene glycol, having a weight average molecular weight Mw in a range of from 200 to 800 g/mol, and (a2b) a second polypropylene glycol, having a weight average molecular weight Mw of 800 to 2.000 g/mol.

2. The polyurethane prepolymer composition of claim 1, wherein the weight average molecular weight Mw of the first polypropylene glycol (a2a) is in a range of from 200 to 600 g/mol.

3. The polyurethane prepolymer composition of claim 1, wherein the prepolymer comprises the 2:1 stoichiometric adduct in a range of from more than 30 to less than 75 wt %.

4. The polyurethane prepolymer composition of claim 1, wherein the free diisocyanate monomer is present in a range of from more than 0 to less than 0.1 wt. %, based on the total polyurethane prepolymer weight.

5. A curable polyurethane prepolymer composition, comprising:
the polyurethane prepolymer composition of claim 1; and
a curative,
wherein the curative is a diamine, a polyol, or a blend thereof.

6. A method for adhesively joining or sealing two substrates, the method comprising:
(1) applying onto a substrate the curable polyurethane prepolymer composition of claim 5; and
(2) contacting the curable polyurethane prepolymer composition applied on the substrate to a second substrate such that a bond is formed.

7. An adhesive, comprising:
the curable polyurethane prepolymer composition of claim 5.

8. The polyurethane prepolymer composition of claim 1, wherein the free diisocyanate monomer is present in a range of from more than 0 to less than 0.5 wt. %.

9. The polyurethane prepolymer composition of claim 1, wherein the NCO content of the polyurethane prepolymer is 5 wt. %.

10. The polyurethane prepolymer composition of claim 1, wherein the NCO content of the polyurethane prepolymer is 7 wt %.

11. The polyurethane prepolymer composition of claim 1, wherein the polyol has a weight average molecular weight (Mw), determined with gel permeation chromatography (GPC), in a range of from 250 to 4,000 g/mol.

12. The polyurethane prepolymer composition of claim 1, wherein the weight average molecular weight Mw of the first polypropylene glycol (a2a) is in a range of from 400 to 600 g/mol.

13. A curable polyurethane prepolymer composition, comprising:
the polyurethane prepolymer composition of claim 1; and
1,4-butanediol or hydroquinone bis(2-hydroxyethyl) ether.

14. The polyurethane prepolymer composition of claim 1, wherein the prepolymer comprises the 2:1 stoichiometric adduct in a range of from more than 30 to 70 wt. %, based on total prepolymer composition weight.

15. The polyurethane prepolymer composition of claim 1, wherein the prepolymer comprises the 2:1 stoichiometric adduct in a range of from 35 to less than 75 wt. %, based on total prepolymer composition weight.

16. The polyurethane prepolymer composition of claim 1, wherein the prepolymer comprises the 2:1 stoichiometric adduct in a range of from 35 to 70 wt. %, based on total prepolymer composition weight.

17. The polyurethane prepolymer composition of claim 1, wherein the prepolymer comprises the 2:1 stoichiometric adduct in a range of from 35 to 65 wt. %, based on total prepolymer composition weight.

18. The polyurethane prepolymer composition of claim 1, wherein the first polypropylene glycol (a2a) is PPG-500.

19. The polyurethane prepolymer composition of claim 1, wherein the first polypropylene glycol (a2a) is PPG-500, and
wherein the second polypropylene glycol (a2b) is PPG-1100.

* * * * *